US008977514B2

(12) United States Patent
Itani et al.

(10) Patent No.: US 8,977,514 B2

(45) Date of Patent: Mar. 10, 2015

(54) THERMAL ACTIVITY DETECTION AND RESPONSE

(75) Inventors: Ibrahim Itani, Richardson, TX (US); Yogesh Sawant, Irving, TX (US); Venugopal Jagannathan, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 497 days.

(21) Appl. No.: 13/362,158

(22) Filed: Jan. 31, 2012

(65) Prior Publication Data

US 2013/0197853 A1 Aug. 1, 2013

(51) Int. Cl.

| | |
|---|---|
| ***G01K 1/00*** | (2006.01) |
| ***G01K 3/00*** | (2006.01) |
| ***G01K 5/00*** | (2006.01) |
| ***G01K 7/00*** | (2006.01) |
| ***G01K 9/00*** | (2006.01) |
| ***G01K 11/00*** | (2006.01) |
| ***G01K 13/00*** | (2006.01) |
| ***G01K 17/00*** | (2006.01) |
| ***G06F 12/00*** | (2006.01) |
| ***G06F 15/16*** | (2006.01) |
| ***G06F 17/30*** | (2006.01) |

(52) U.S. Cl.

USPC .................................... 702/130; 707/999.102

(58) Field of Classification Search

CPC ........................................................ H04N 5/33

USPC ........................................................ 702/130

See application file for complete search history.

(56) References Cited

U.S. PATENT DOCUMENTS

2006/0242186 A1 * 10/2006 Hurley .......................... 707/102

* cited by examiner

*Primary Examiner* — John Breene

*Assistant Examiner* — Manuel Rivera Vargas

(57) ABSTRACT

A device may receive thermal event data corresponding to thermal activity. The thermal event data may be received from a sensor device corresponding to a detection zone. The device may determine whether the thermal event data exceeds a detection threshold. The device may create a response to the thermal event data when the thermal event data exceeds the detection threshold. When the thermal event data does not exceed the detection threshold, the device may disregard the thermal event data.

20 Claims, 5 Drawing Sheets

THERMAL ACTIVITY DETECTION AND RESPONSE

BACKGROUND

Currently available technologies for detecting fires include a variety of different devices, such as smoke detectors and carbon dioxide ($CO_2$) detectors. However, such technologies are inadequate in many situations. For instance, such technologies are often passive in nature because they implement an alarm that is frequently only responsive to problems (e.g., fire, smoke, excessive $CO_2$ levels, etc.) that have already grown beyond control.

DETAILED DESCRIPTION OF PREFERRED EMBODIMENTS

The following detailed description refers to the accompanying drawings. The same labels and/or reference numbers in different drawings may identify the same or similar elements.

Systems and/or methods, described herein, may be used to detect and respond to thermal activity (e.g., fires, sparks, etc.). For example, a thermal detection system may receive thermal imaging data corresponding to thermal activity occurring within particular detection zone (e.g., a kitchen), may analyze the thermal imaging data to identify an appropriate detection threshold based on the type of thermal activity, and may determine whether the thermal activity exceeds the detection threshold. When the thermal activity does not exceed the detection threshold, the thermal detection system may disregard the thermal imaging data. However, when the thermal activity exceeds the detection threshold, the thermal detection system may respond to the thermal activity in a variety of ways, such as sounding an alarm, activating a fire prevention system (e.g., a sprinkling system, a flame retardant distribution system etc.), contacting an emergency support system (e.g., a privately run call center that provides emergency response and/or support), and/or contacting a public service entity, such as a fire department.

Figure 1:
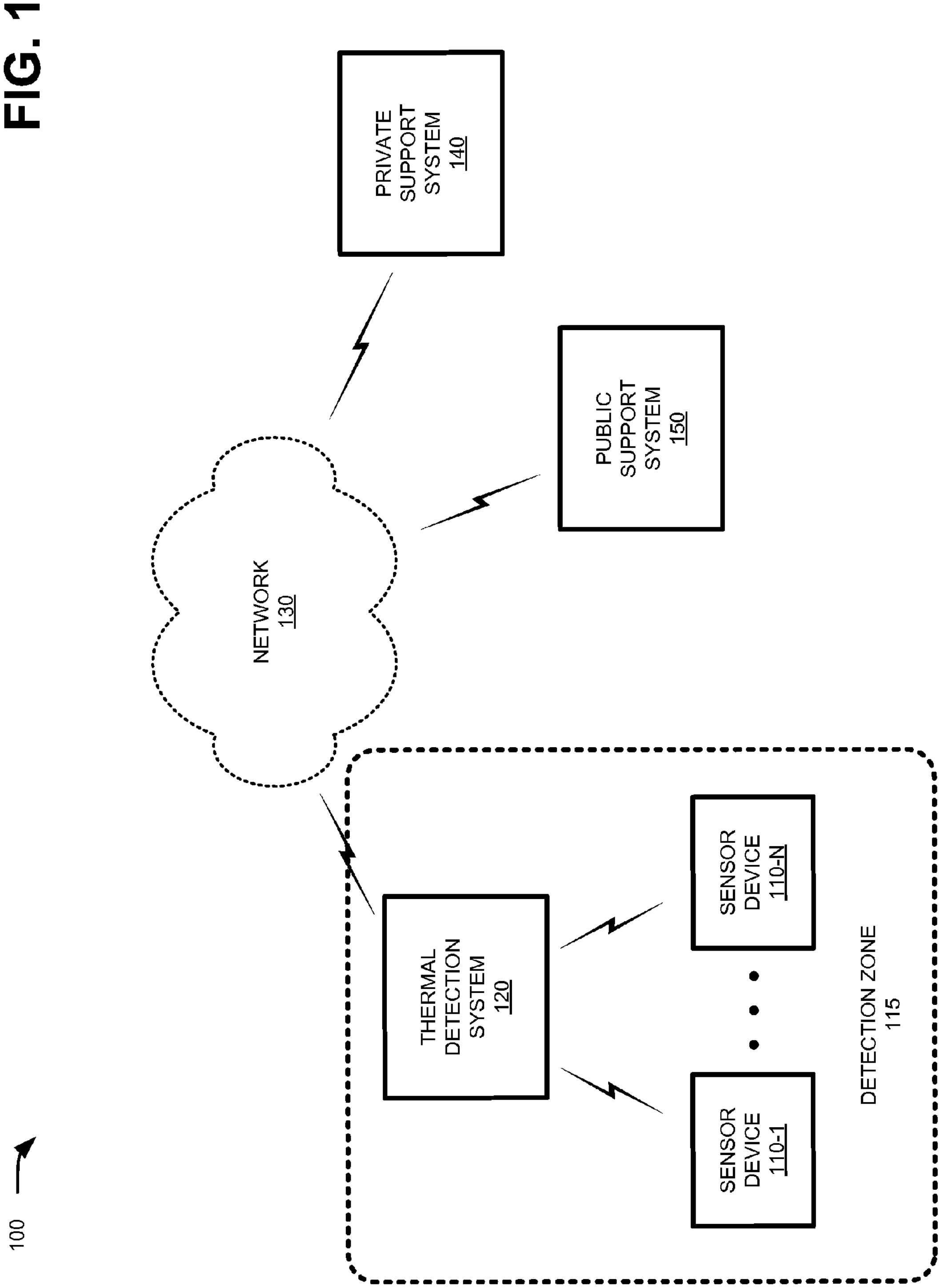
FIG. 1 is a diagram of an example environment in which systems and/or methods, described herein, may be implemented.

FIG. 1 is a diagram of an example environment 100 in which systems and/or methods, described herein, may be implemented. As depicted, environment 100 may include sensor devices 110-1, . . . , 110-N (where N≥1) (hereinafter referred to collectively as "sensor devices 110," and individually as "sensor device 110"), a detection zone 115, a thermal detection system 120, a network 130, a private support system 140, and a public support system 150. The number of devices, systems, and/or networks, illustrated in FIG. 1, is provided for explanatory purposes only. In practice, there may be additional devices, systems, and/or networks, fewer devices, systems, and/or networks, different devices, systems, and/or networks, or differently arranged devices, systems, and/or networks than illustrated in FIG. 1.

Also, in some implementations, one or more of the devices/systems of environment 100 may perform one or more functions described as being performed by another one or more of the devices/systems of environment 100. Devices/systems of environment 100 may interconnect via wired connections, wireless connections, or a combination of wired and wireless connections.

Sensor device 110 may include a variety of thermal sensing devices. For example, sensor device 110 may include a device that is capable of detecting thermal radiation within detection zone 115. Sensor device 110 may also, or alternatively, be capable of capturing or producing information that provides an indication of the thermal radiation. Sensor device 110 may be capable of communicating with other sensor devices 110 and/or thermal detection system 120. For instance, sensor device 110 may be capable of detecting a fire (or another type of thermal activity) within detection zone 115, producing thermal images (or another type of thermal event data) corresponding to the fire, and communicating the thermal images to thermal detection system 120. Additionally, or alternatively, sensor device 110 may be capable of detecting and/or producing information corresponding to other types of events (e.g., motion, vibrations, microwaves, visible light, ultraviolet radiation, etc.) occurring in detection zone 115.

Detection zone 115 may include any type of geographical location. For example, detection zone 115 may include a space within a home, an apartment, or another type of residence, such as a kitchen, a bedroom, a dining area, etc. Detection zone 115 may also, or alternatively, include a space within a store, an office building, a warehouse, or another type of commercial building. Additionally, or alternatively, detection zone 115 may include an outdoor area, such as a yard, a driveway, a patio, a parking lot, etc.

Thermal detection system 120 may include one or more computing devices, that gather, process, search, store, and/or provide information in a manner similar to that described herein. For instance, thermal detection system 120 may communicate with sensor devices 110 and/or network 130, as depicted in FIG. 1. In one example implementation, thermal detection system 120 may receive thermal event data, such as thermal images, from one or more sensor devices 110, may analyze the thermal activity data to identify an appropriate detection threshold based on the type of thermal activity detected, and may determine whether the thermal event data exceeds the detection threshold. In some implementations, thermal detection system 120 may disregard the thermal event data if the detection threshold is not exceeded. Additionally, or alternatively, thermal detection system 120 may respond to the thermal activity when the thermal event data exceeds the detection threshold.

Network 130 may include any type of network and/or combination of networks. For example, network 130 may include a local area network (LAN) (e.g., an Ethernet network), a wireless LAN (WLAN) (e.g., an 802.11 network); a wide area network (WAN) (e.g., the Internet); a wireless WAN (WWAN) (e.g., a 3GPP System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, a Worldwide Interoperability for Microwave Access (WiMAX) network, etc.); etc. Additionally, or alternatively, network 130 may include a fiber optic network; a metropolitan area network (MAN); an ad hoc network; a virtual network (e.g., a virtual private network (VPN)); a telephone network (e.g., a Public Switched Telephone Network (PSTN)); a cellular network; a Voice over Internet Protocol (VoIP) network; or another type of network. In one example, network 130 may include a network backbone corresponding to the Internet or another type of WAN.

Private support system 140 may include one or more types of computing devices. For example, private support system 140 may include a telephone system, a server, a cluster of servers, or one or more other types of computing devices. In one example, private support system 140 may enable a company or other type of organization to provide support or assistance to thermal detection system 120. For instance, when thermal detection system 120 detects thermal activity that exceeds a detection threshold, thermal detection system 120 may notify private support system 140 regarding the thermal activity. Such a notification may, for example, enable an operator of private support system 140 to call or otherwise contact the owners or operators of thermal detection system 120 to find out more about the thermal activity, determine whether assistance is required for the thermal activity, or provide other types of services.

Public support system 150 may include one or more types of computing devices. For example, public support system 140 may include a telephone system, a server, a cluster of servers, or one or more other types of computing devices. In one example, public support system 150 may enable a public entity, such as a local fire department, a local police department, or another type of public entity, to receive notifications of thermal activity from thermal detection system 120 and/or private support system 140. For instance, when thermal detection system 120 detects a fire or another type of thermal activity, thermal detection system 120 may provide public support system 150 with information corresponding to the thermal activity. Doing so may, for example, enable a prompt response to fires or other thermal activity detected by thermal detection system 120.

Figure 2:
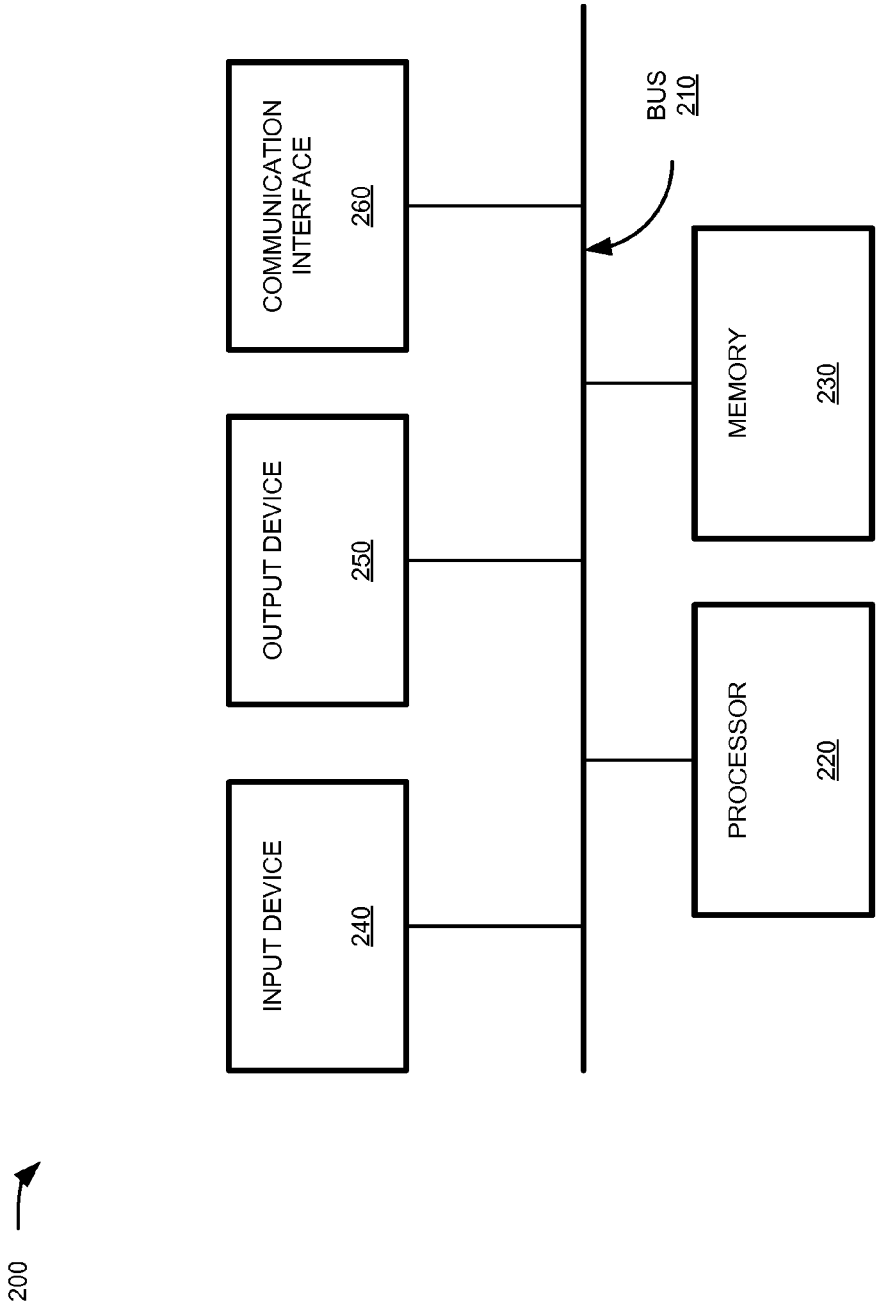
FIG. 2 is a diagram of an example of a device of FIG. 1.

FIG. 2 is a diagram of example components of a device 200 that may be used within environment 100 of FIG. 1. Device 200 may correspond to sensor device 110, thermal detection system 120, private support system 140, and/or public support system 150. Each of sensor device 110, thermal detection system 120, private support system 140, and/or public support system 150 may include one or more of devices 200 and/or one or more of the components of device 200.

As depicted, device 200 may include a bus 210, a processor 220, memory 230, an input device 240, an output device 250, and a communication interface 260. Although FIG. 2 shows example components of device 200, in other implementations, device 200 may include fewer components, additional components, different components, or differently arranged components than those illustrated in FIG. 2. Alternatively, or additionally, one or more components of device 200 may perform one or more tasks described as being performed by one or more other components of device 200.

Bus 210 may permit communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 220 may control the overall operation, or a portion thereof, of device 200, based on, for example, an operating system (not illustrated), and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 240 may include one or more components that permit a user to input information into device 200. For example, input device 240 may include a keypad, a keyboard, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type of wireless or wired interface. Communication interface 260 may also include an antenna (or a set of antennas) that permit wireless communication, such as the transmission and reception of radio frequency (RF) signals.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 220 to perform one or more processes described herein. Alternatively, hardwired circuitry may be used in place of, or in combination with, software instructions to implement processes described herein. Thus, implementations described herein are not limited to any specific combination of hardware circuitry and software.

Figure 3:
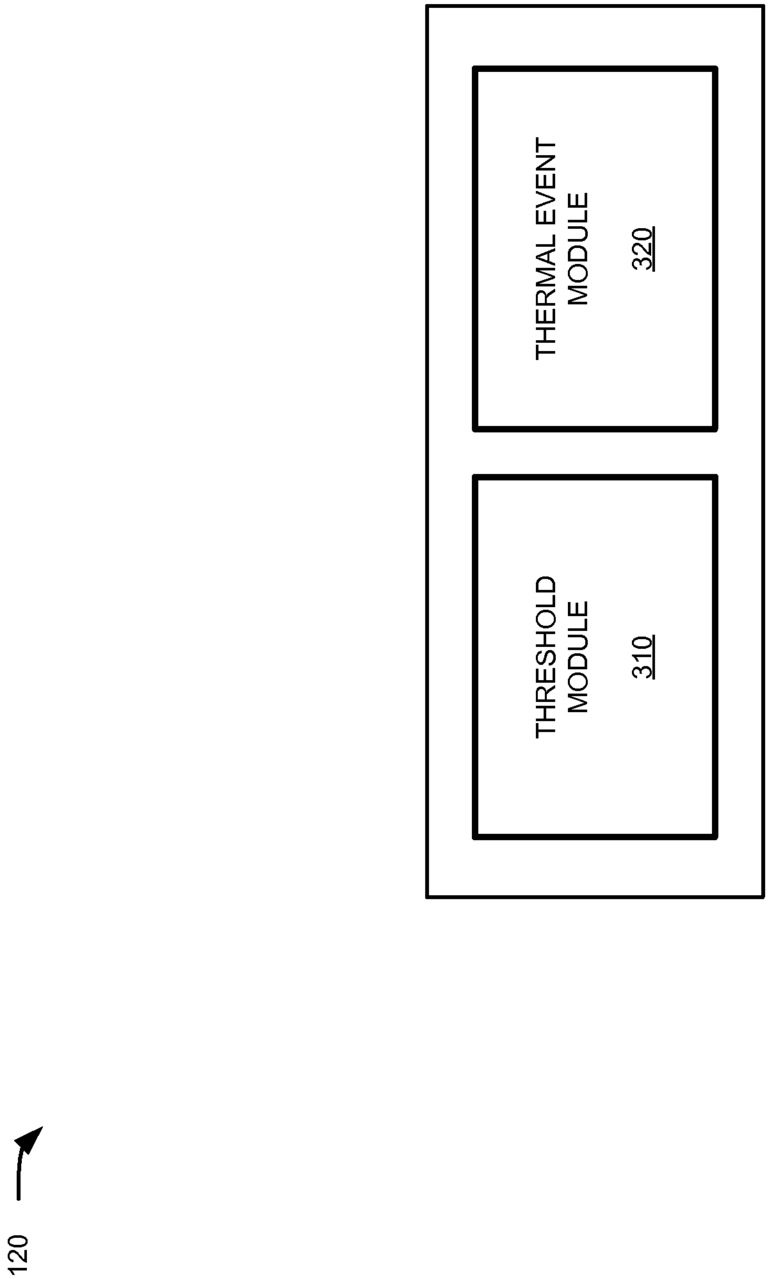
FIG. 3 is a diagram of example functional components of a thermal detection system according to one or more implementations described herein.

FIG. 3 is a diagram of example functional components of thermal detection system 120 according to one or more implementations described herein. As illustrated, thermal detection system 120 may include a threshold module 310 and a thermal event module 320. Depending on the implementation, one or more of modules 310 and 320 may be implemented as a combination of hardware and software based on the components illustrated and described with respect to FIG. 2. Alternatively, modules 310 and 320 may each be implemented as hardware based on the components illustrated and described with respect to FIG. 2.

Threshold module 410 may provide functionality with respect to detection thresholds. For example, threshold module 410 may enable thermal detection system 120 to cause sensor device 110 to capture thermal event data corresponding to detection zone 115. The thermal event data may reflect typical thermal conditions of detection zone 115. Threshold module 410 may also, or alternatively, enable thermal detection system 120 to associate the thermal event data with one or more types of context data, such as a time of day, a type of detection zone (e.g., a kitchen, a bedroom, etc.), a location within the detection zone, a type of thermal event data (e.g., thermal images), etc. Additionally, or alternatively, threshold module 410 may enable thermal detection system 120 to produce one or more detection thresholds based on the thermal event data.

Thermal event module 420 may provide functionality with respect to thermal activity. For example, thermal event module 420 may enable thermal detection system 120 to receive thermal event data, from sensor devices 110, corresponding to thermal activity occurring within detection zone 115. Thermal event module 420 may also, or alternatively, enable thermal detection system 120 to analyze the thermal event data to identify an appropriate detection threshold, and/or to determine whether the thermal event data exceeds the detection threshold. Additionally, or alternatively, thermal event module 420 may enable thermal detection system 120 to respond to thermal activity by, for example, notifying private support system 140 and/or public support system 150 when the thermal event data exceeds the detection threshold.

In addition to the functionality described above, functional components of thermal detection system 120 may also, or alternatively, provide functionality as described elsewhere herein. Additionally, or alternatively, as described below, one or more of the functions or operations of thermal detection system 120 may be performed by another device. Further, while FIG. 3 shows a particular number and arrangement of modules, in alternative implementations, thermal detection system 120 may include additional modules, fewer modules, different modules, or differently arranged modules than those depicted in FIG. 3.

Figure 4:
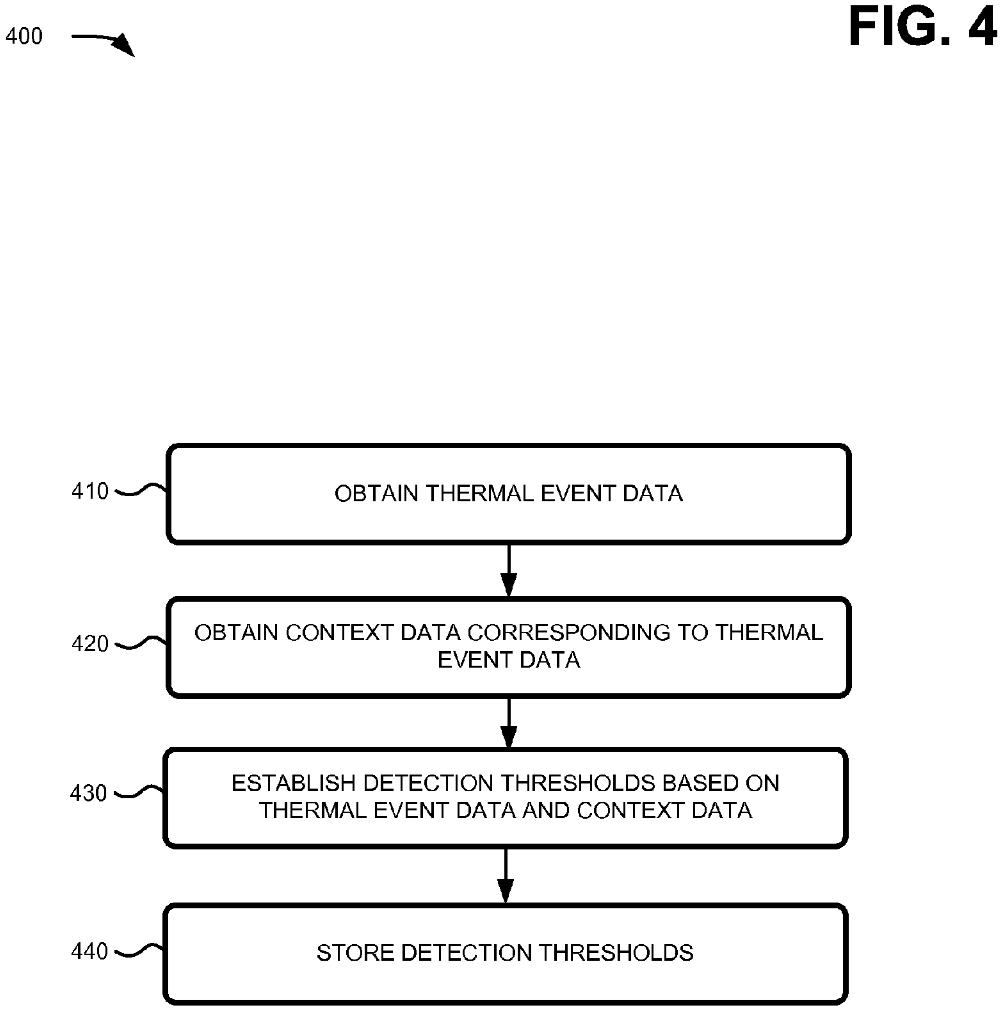
FIG. 4 is a flow chart of an example process for establishing detection thresholds according to one or more implementations described herein.

FIG. 4 is a flow chart of an example process 400 for establishing detection thresholds according to one or more implementations described herein. In one or more implementations, process 400 may be performed by thermal detection system 120. In other implementations, some or all of process 400 may be performed by one or more other devices, or a group of devices, including or excluding thermal detection system 120.

As shown in FIG. 4, process 400 may include obtaining thermal event data (block 410). For example, thermal detection system 120 may communicate with sensor device 110 to obtain thermal event data corresponding to detection zone 115. Thermal event data, as described herein, may include any type of thermal information, such as a thermal image and/or another type of thermal radiation information. As mentioned above, the detection zone 115 may include a kitchen space, a bedroom space, an office space, or another type of space or area, and the thermal event data may include information corresponding to thermal conditions within detection zone 115. For instance, the thermal event data may correspond to thermal conditions that are common, standard, or otherwise acceptable for detection zone 115. As such, thermal detection system 120 may proactively obtain thermal event data in order to survey standard thermal conditions for a particular detection zone 115.

Process 400 may also include obtaining context data corresponding to the thermal event data (block 420). For example, thermal detection system 120 may, at some point, obtain context data that corresponds to thermal event data. Context data may include any type of information that relates to thermal event data. For example, context data may include information corresponding to a time that thermal event data was received or otherwise obtained, a type of thermal event data (e.g., thermal images), a location, an area, or another type of space (e.g., a location within detection zone 115) where thermal event data was captured, and/or another type of information corresponding to thermal event data. The context data may be obtained from sensor devices 110, from one or more of the systems described herein, and/or from another source, such as from a user interacting with thermal detection system 120.

For example, if the thermal event data was obtained from a kitchen area at or around the time that food is being cooked, the context data may include information describing such a scenario. Similarly, if the thermal event data was obtained from a bedroom late at night (e.g., while an individual is sleeping in the bedroom), the context data may include information describing such a scenario. As such, thermal detection system 120 may not only be capable of obtaining thermal event data, but thermal detection system 120 may also be capable of associating the thermal event data with context data, which may later be used to, for example, more accurately evaluate thermal activity corresponding to detection zone 115.

As illustrated in FIG. 4, process 400 may include establishing detection thresholds based on the thermal event data and the context data (block 430). For example, thermal detection system 120 may create, calculate, or otherwise determine one or more detection thresholds based on the thermal event data and/or the context data. A detection threshold may include, for example, information that describes or otherwise corresponds to a level of thermal activity, a degree of thermal activity, a size of thermal activity, a location of thermal activity, a type of thermal activity, and/or another type of characteristic corresponding to thermal activity. For instance, a detection threshold may include a number (e.g., 5, 6, 7, etc.), within a range of numbers (e.g., 1-10, 1-20, etc.), that represents an abnormal level of thermal activity. A detection threshold may also, or alternatively, correspond to a size, a shape, a quantity, a frequency, and/or another type of characteristic corresponding to a flame, a spark, body heat, steam, smoke, or another type of thermal activity.

Additionally, or alternatively, the detection threshold may be context-specific. For example, a detection threshold for a kitchen during a time of day when cooking is common may correspond to a greater degree of thermal activity then another detection threshold for the kitchen during a time of day when cooking is not common. Similarly, a detection threshold for the kitchen during a time of day when cooking is common may correspond to a greater degree of thermal activity then a detection threshold for a bedroom at the same time of day or at a different time of day. As such, thermal detection system 120 may create a variety of different detection thresholds that may vary according to type, kind, form, scale, context, etc.

As further shown in FIG. 4, process 400 may include storing the detection thresholds (block 440). For instance, thermal detection system 120 may store one or more detection thresholds corresponding to detection zone 115. In some implementations, one or more of the detection thresholds may be stored locally. In certain implementations, one or more of the detection thresholds may also, or alternatively, be stored remotely (e.g., by sensor device 110, by private support system 140, by public support system 150, etc.). As described below, the stored detection thresholds may later be used to determine whether thermal activity occurring within detection zone 115 is to be reported.

Figure 5:
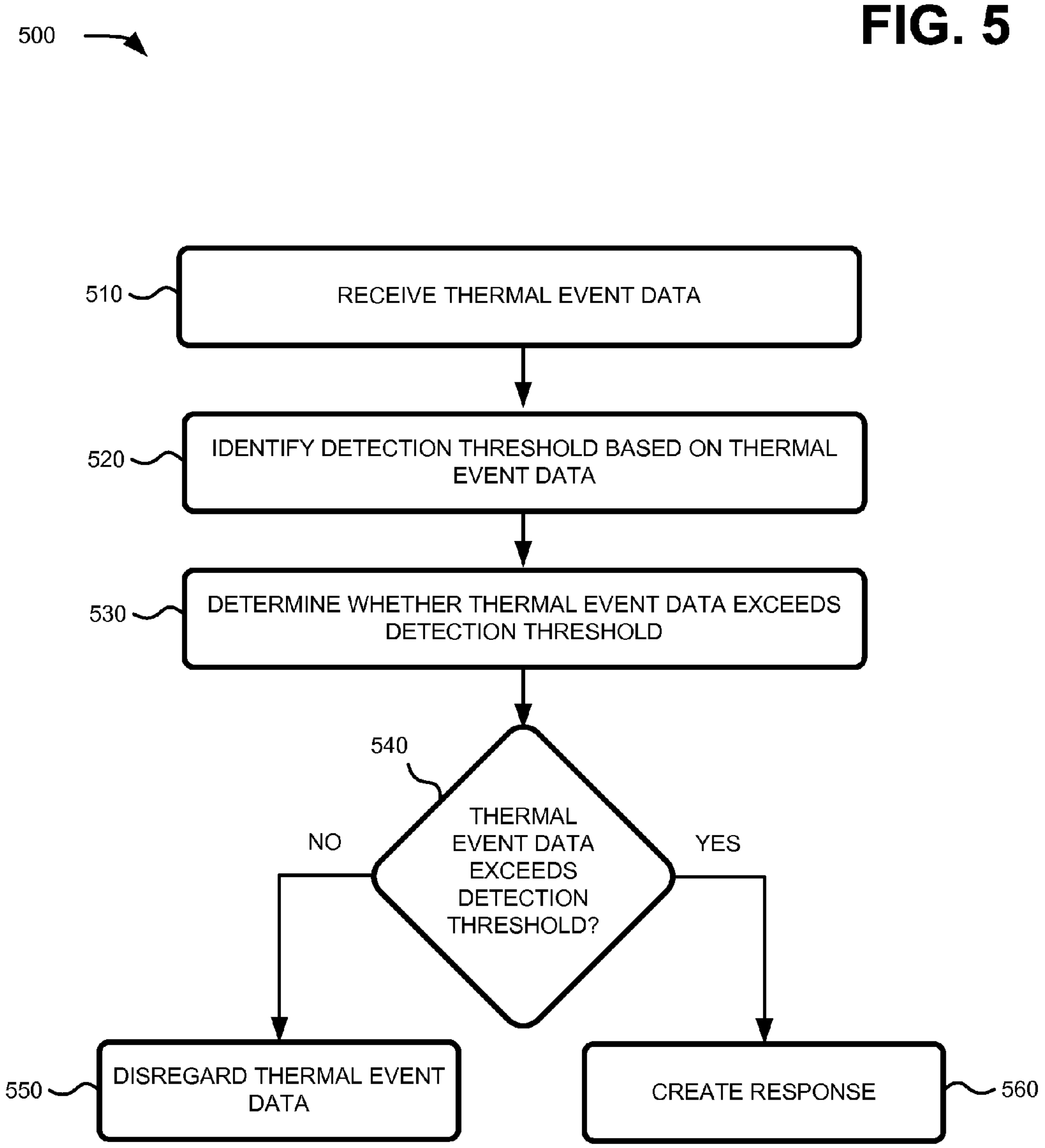
FIG. 5 is a flow chart of an example process for detecting thermal activity according to one or more implementations described herein.

FIG. 5 is a flow chart of an example process 500 for detecting thermal activity according to one or more implementations described herein. In one or more implementations, process 500 may be performed by thermal detection system 120. In other implementations, some or all of process 500 may be performed by one or more other devices, or a group of devices, including or excluding thermal detection system 120.

As illustrated in FIG. 5, process 500 may include receiving thermal event data (block 510). For example, thermal detection system 120 may receive thermal event data corresponding to thermal activity occurring within detection zone 115. The thermal event data may correspond to thermal activity detected by one or more sensor devices 110. As mentioned above, the thermal event data may include a variety of one or more types of information corresponding to thermal activity, and detection zone 115 may include a variety of one or more types of areas or spaces. For instance, the thermal event data may correspond to a grease fire that has started in a kitchen area that is being monitored by one or more sensor devices 110. In some implementations, thermal detection system 120 may also, or alternatively, receive or otherwise obtain context data corresponding to the thermal event data.

Process 500 may also include identifying a detection threshold based on the thermal event data (block 520). For example, thermal detection system 120 may determine which detection threshold is appropriate for the thermal activity based on the thermal event data. In some implementations, thermal detection system 120 may also, or alternatively, determine which detection threshold is appropriate based on context data corresponding to the thermal event data. For instance, thermal detection system 120 may analyze the thermal event data to determine a type of thermal activity (e.g., a spark, a fire, smoke, body heat, etc.) corresponding to the thermal event data and identify a detection threshold that corresponds to the type of thermal activity (e.g., a spark threshold, a fire threshold, a smoke threshold, a body heat threshold, etc.).

Additionally, or alternatively, thermal detection system 120 may analyze the context data corresponding to the thermal event data to determine an appropriate threshold. For instance, thermal detection system 120 may analyze the context data to determine a time of day, a particular detection zone 115, a location within the particular detection zone 115, etc., corresponding to the thermal event data, and thermal detection system 120 may identify or select a detection threshold based on the context data.

As further shown in FIG. 5, process 500 may include determining whether the thermal event data exceeds the detection threshold (block 530). For instance, thermal detection system 120 may determine whether the thermal activity corresponding to the thermal event data exceeds the detection threshold that was identified based on the thermal event data and/or context data corresponding to the thermal activity. As mentioned above, the type of thermal detection threshold used to make this determination may vary depending on, for example, the type of thermal activity occurring within detection zone 115.

When the thermal event data does not exceed the detection threshold (block 540—NO), process 500 may include disregarding the thermal event data (block 550). For example, when the thermal activity corresponding to the thermal event data does not exceed the detection threshold and does not amount to a dangerous or potentially dangerous situation, thermal detection system 120 may disregard the thermal event data so as to avoid a false alarm scenario.

As further shown in FIG. 5, when the thermal event data exceeds the detection threshold (block 540—YES), process 500 may include creating a thermal event response (block 560). In contrast to the scenario mentioned above, when the thermal activity corresponding to the thermal event data does, in fact, exceeds the detection threshold and amounts to a dangerous or potentially dangerous situation, thermal detection system 120 may create, generate, or otherwise produce a response that is commensurate with the detected situation. The response created by thermal detection system 120 may include an audio signal (e.g., an alarm), a visual signal (e.g., a light, a visual message, etc.), and/or a combination of an audio signal and a visual signal.

Thermal detection system 120 may also, or alternatively, communicate with private support system 140 to, for example, notify private support system 140 of the thermal activity and/or thermal event data. Similarly, thermal detection system 120 may also, or alternatively, communicate with public support system 150 to notify public support system 150 of the thermal activity and/or thermal event data. In some implementations, thermal detection system 120 may communicate a wide variety of information to private support system 140, public support system 150, or another type of system or device, such as the thermal event data, a portion of the thermal event data, the context data, a portion of the context data, or one or more other types of information relating to reporting the thermal activity. Accordingly, thermal detection system 120 may detect or otherwise receive thermal event data corresponding to thermal activity within detection zone 115, may determine whether the thermal activity exceeds a threshold corresponding to typical or acceptable thermal activity, and may respond to the thermal activity in an appropriate manner.

Systems and/or methods, described herein, may be used to detect and respond to thermal activity. For instance, thermal detection system 120 may obtain thermal event data corresponding to thermal activity occurring within detection zone 115. Thermal detection system 120 may also, or alternatively, obtain context data corresponding to the thermal activity. The thermal event data may be analyzed by thermal detection system 120 to identify an appropriate detection threshold, and thermal detection system 120 may use the detection threshold to determine whether thermal activity warrants a response from thermal detection system 120. For instance, when the thermal activity does not exceed the detection threshold, thermal detection system 120 may disregard the thermal event data. However, when the thermal activity exceeds the detection threshold, thermal detection system 120 may respond to the thermal activity in a variety of ways, such as sounding an alarm, contacting private support system 140, and/or contacting public support system 150. Thus, the systems and/or methods may provide a dynamic solution to safe guarding an area (e.g., detection zone 115) against dangerous or potentially dangerous thermal activity such as fires.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 4-6, the order of the blocks may be modified in other implementations. Further, non-dependent blocks may be performed in parallel.

It will be apparent that example aspects, as described herein, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve components that perform one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving, by a computing device, context data,
 the context data including time of day information;
receiving, by the computing device, thermal event data corresponding to thermal activity,
 the computing device being associated with a detection zone,
 the detection zone being associated with a detection threshold that is based on the context data, and
 the thermal event data being received from a sensor device associated with the detection zone;
determining, by the computing device and based on the context data, whether the thermal event data exceeds a detection threshold,
 the detection threshold being associated with a first threshold during a first time of day, and
 the detection threshold being associated with a second threshold during a second time of day,
 the first time of day being different than the second time of day, and
 the first threshold being different than the second threshold;
 creating, by the computing device and when the thermal event data exceeds the detection threshold, a response to the thermal event data; and
disregarding, by the computing device and when the thermal event data does not exceed the detection threshold, the thermal event data.

2. The method of claim 1, further comprising:

establishing, prior to receiving the thermal event data, a plurality of detection thresholds based on thermal event data and the context data; and
identifying, subsequent to receiving the thermal event data, the detection threshold, from the plurality of detection thresholds, based on the thermal event data and the context data.

3. The method of claim 1, where the context data further includes information associated with thermal activity.

4. The method of claim 1, further comprising:

identifying the detection threshold, from a plurality of detection thresholds, based on the thermal event data.

5. The method of claim 1, further comprising:

identifying the detection threshold, from a plurality of detection thresholds, based on the thermal event data and the context data.

6. The method of claim 1, further comprising:

identifying the response, from a plurality of responses, based on the thermal event data.

7. The method of claim 1, where creating the response comprises at least one of:

creating an audio signal,
creating a visual signal,
creating an audio-visual signal,
notifying a private support system regarding the thermal activity, or
notifying a public support system regarding the thermal activity.

8. The method of claim 1, further comprising:

establishing, prior to receiving the thermal event data corresponding to the thermal activity, the detection threshold based on thermal event data associated with the detection zone.

9. A device comprising:

a processor to:
 receive context data,
 the context data including time of day information;
 receive, from a sensor device, thermal event data corresponding to thermal activity associated with a detection zone,
 the detection zone being associated with a detection threshold that is based on the context data;
 identify the detection threshold based on the thermal event data;
 determine, based on the context data, whether the thermal event data exceeds the detection threshold,
 the detection threshold being associated with a first threshold during a first time of day, and
 the detection threshold being associated with a second threshold during a second time of day,
 the first time of day being different than the second time of day, and
 the first threshold being different than the second threshold;
 create, when the thermal event data exceeds the detection threshold, a response to the thermal activity; and
 disregard, when the thermal event data does not exceed the detection threshold, the thermal event data.

10. The device of claim 9, where the processor is further to:

establish a plurality of detection thresholds based on thermal event data and the context data.

11. The device of claim 10, where, when identifying the detection threshold, the processor is further to:

identify the detection threshold from a plurality of detection thresholds, based on the thermal event data and the context data.

12. The device of claim 9, where the processor is further to:

identify the detection threshold, from a plurality of detection thresholds, based on the thermal event data and the context data.

13. The device of claim 9, where the processor is further to:

create the response, from a plurality of responses, based on the thermal event data.

14. The device of claim 9, where the response includes at least one of:

an audio signal,
a visual signal, an audio-visual signal, a notification to a private support system regarding the thermal activity, or a notification to a public support system regarding the thermal activity.

15. The device of claim 9, where the processor is further to:

establish the detection threshold based on thermal event data.

16. One or more non-transitory computer-readable storage media storing instructions, the instructions comprising:

one or more instructions that, when executed by a processor of a device, cause the processor to:

receive context data, the context data including time of day information;

obtain thermal event data corresponding to thermal activity associated with a detection zone, the detection zone being associated with a detection threshold that is based on the context data;

establish a plurality of detection thresholds based on the thermal event data and the context data, a first detection threshold, of the plurality of detection thresholds, being associated with a first time of day, and a second detection threshold, of the plurality of detection thresholds, being associated with a second time of day, the first time of day being different than the second time of day, and the first detection threshold being different than the second detection threshold;

store the plurality of detection thresholds;

receive particular thermal event data corresponding to particular thermal activity within the detection zone;

determine whether the particular thermal event data exceeds at least one detection threshold of the plurality of detection thresholds; and create, when the particular thermal event data exceeds the at least one detection threshold, a response to the particular thermal event data.

17. The computer-readable storage media of claim 16, further comprising:

one or more instructions that, when executed by the processor of the device, cause the processor to:

disregard, when the particular thermal event data does not exceed the at least one detection threshold, the particular thermal event data.

18. The computer-readable storage media of claim 16, where the response comprises at least one of:

an audio signal, a visual signal, an audio-visual signal, a notification to a private support system regarding the particular thermal activity, or a notification to a public support system regarding the particular thermal activity.

19. The computer-readable storage media of claim 16, where the particular thermal event data is received from a sensor device corresponding to the detection zone.

20. The computer-readable storage media of claim 16, further comprising:

one or more instructions that, when executed by the processor of the device, cause the processor to:

identify the at least one detection threshold based on the particular thermal event data and the context data; and identify the response, from a plurality of responses, based on the particular thermal event data and the context data.

* * * * *